United States Patent
Yao et al.

(10) Patent No.: US 12,192,818 B2
(45) Date of Patent: *Jan. 7, 2025

(54) SYSTEMS AND METHODS TO AUTOMATICALLY CREATE DEDICATED BEARERS DURING FAILURE EVENT

(71) Applicant: DISH Wireless L.L.C., Englewood, CO (US)

(72) Inventors: Kevin Yao, Cheyenne, WY (US); Prashant Raghuvanshi, Parker, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,765

(22) Filed: Jun. 21, 2023

(65) Prior Publication Data

US 2023/0345291 A1    Oct. 26, 2023

Related U.S. Application Data

(63) Continuation of application No. 17/354,816, filed on Jun. 22, 2021, now Pat. No. 11,722,924.

(51) Int. Cl.
*H04W 28/02* (2009.01)
*H04L 65/1069* (2022.01)
*H04L 65/1104* (2022.01)

(52) U.S. Cl.
CPC ..... *H04W 28/0263* (2013.01); *H04L 65/1069* (2013.01); *H04L 65/1104* (2022.05); *H04W 28/0268* (2013.01)

(58) Field of Classification Search
CPC . H04L 65/1069; H04L 65/1104; H04L 65/80; H04W 28/0263; H04W 28/0268
See application file for complete search history.

(56) References Cited

U.S. PATENT DOCUMENTS

| 8,369,224 B1 | 2/2013 | Chickering et al. |
| 2016/0337962 A1 | 11/2016 | Peng et al. |
| 2019/0357301 A1 | 11/2019 | Li et al. |

*Primary Examiner* — Zhensheng Zhang
(74) *Attorney, Agent, or Firm* — Seed IP Law Group LLP

(57) ABSTRACT

A bearer creation system creates dedicated bearers for sessions requested by user equipment devices based on a policy associated with the user equipment device. The bearer creation system detects that a request to initiate a session has been sent by user equipment associated with a policy. The bearer creation system compares the request to initiate the session to information indicated by the policy, and determines whether to create a dedicated bearer for the session based on the comparison. The bearer creation system creates a dedicated bearer for the session based on a determination that a dedicated bearer should be created.

20 Claims, 8 Drawing Sheets

SYSTEMS AND METHODS TO AUTOMATICALLY CREATE DEDICATED BEARERS DURING FAILURE EVENT

BRIEF SUMMARY

A bearer guarantees a level of quality of service (QOS) for user equipment on a Wireless network. The bearer may be a voice bearer, a data bearer, or other type of bearer, and may be created for a particular session. However, in the event of a failure on the network, such as a link failure, overload, loss of a node, or other failure which affects the creation of a bearer, the network may be unable to create a dedicated bearer, such as dedicated bearers defined by 3GPP specifications for QOS attributes associated with default and dedicated bearers, for user equipment (or "user equipment devices"). As a result, the user equipment is unable to obtain the level of QOS which would have been guaranteed by the dedicated bearer, and must use a default bearer instead. Furthermore, in the event of a failure, the user equipment may be assigned a default bearer, which is shared by other user equipment connected to the network. This may lower quality of service due to the high traffic being shared among other user equipment devices using the default bearer.

The embodiments disclosed herein address the issues above and thus help solve the above technical problems and improve the technology of network bearer creation by providing a technical solution that is able to create a dedicated bearer for user equipment in the event of a failure on the network. Additionally, the embodiments disclosed herein, are further able to facilitate the creation of dedicated bearers in conjunction with network slicing, which allows the creation of dedicated bearers with fewer networking infrastructure components.

In some embodiments, a bearer creation system detects that a request to initiate a session has been sent by user equipment associated with a policy, compares the request to initiate the session to information indicated by the policy, determines whether a dedicated bearer should be created based on the comparison, and enables a local policy to create a dedicated bearer for the session based on a determination that the dedicated bearer should be created. In some embodiments, the bearer creation system receives a request to initiate a session from user equipment, compares the request with a policy associated with the user equipment, determines whether to create a dedicated bearer based on the comparison, and causes the user equipment to conduct the session via the dedicated bearer. In some embodiments, the bearer creation system includes a bearer creation data structure, which can be used to determine whether to create a dedicated bearer for a session based on information indicating a policy associated with a user device and information included in a request to begin a call.

DETAILED DESCRIPTION

Figure 1:
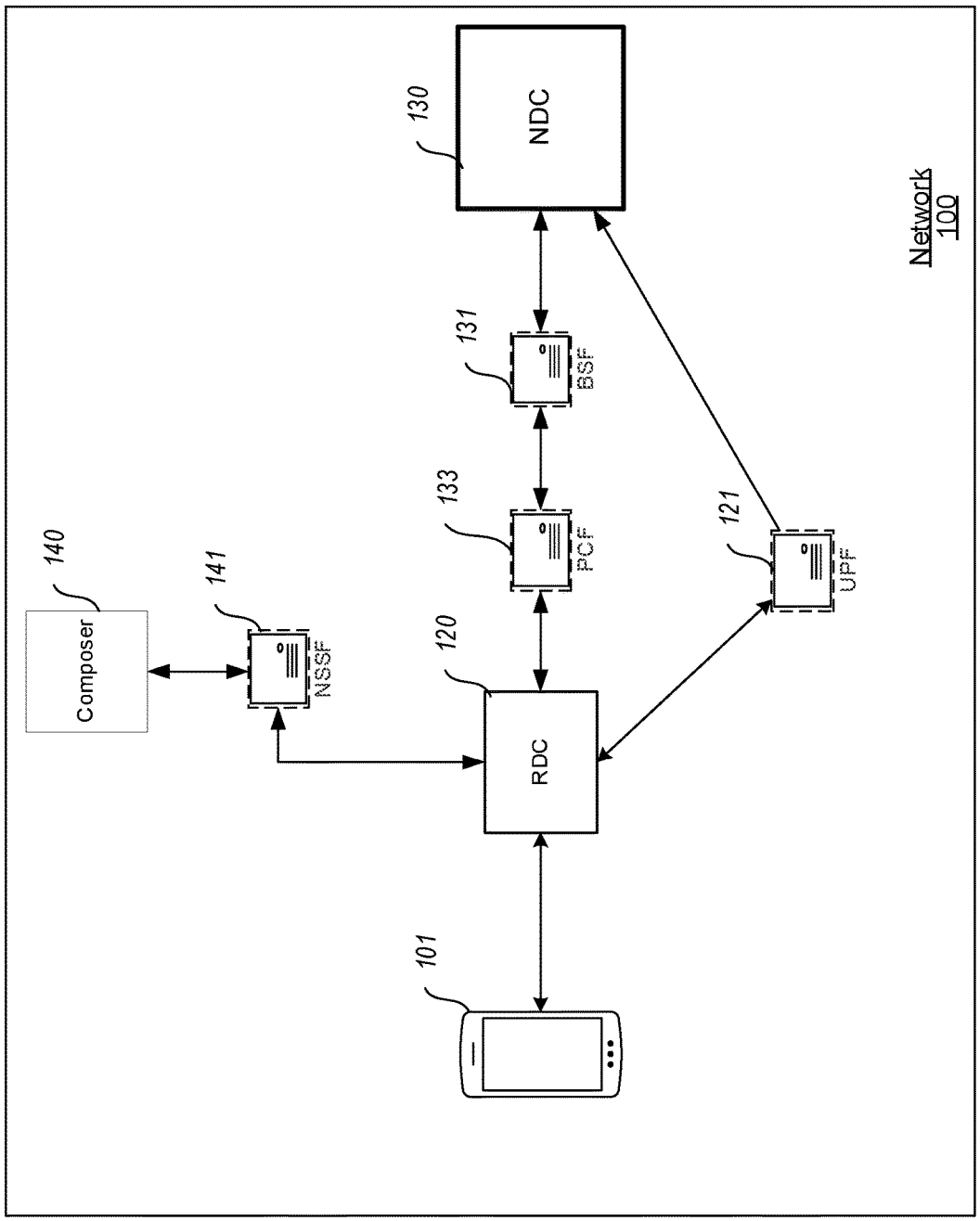
FIG. 1 is a display diagram showing an example network in which the bearer creation system operates, according to various embodiments described herein.

Bearers facilitate and guarantee a level of QOS, such as a bitrate, packet delay, packet loss rate, priority, and other quality of service measures, for a session used by user equipment. A network typically has at least two types of bearers: dedicated bearers, which are bearers created for specific session used by user equipment; and default bearers, which are bearers that are used by user equipment by default. A dedicated bearer typically has a higher guaranteed level of QOS than a default bearer. Furthermore, default bearers typically share a predetermined resource pool on the network, thus as the sessions using a default bearer increase, the QOS of the default bearer decrease because the pool of resources is being shared by more sessions and user equipment devices.

Currently, when a network failure which impacts the creation of bearers occurs, such as a Binding Session Function (BSF) going down, a Policy Control Function (PCF) going down, or other network failures which impact the creation of a bearer, new sessions are routed to a default bearer and dedicated bearers cannot be created. Thus, user equipment devices are unable to obtain the guaranteed quality of service attained by using a dedicated bearer. Additionally, the quality of service of the default bearer is negatively impacted because the resources allocated to the default bearer must be shared among more user equipment devices and sessions than usual.

The embodiments disclosed herein address the issues above and help solve the above technical problems and improve the technology of network bearer creation by providing a technical solution that is able to create a dedicated bearer for user equipment in the event of a failure on the network. A bearer creation system additionally detects that a request to initiate a session has been sent by user equipment associated with a policy. The bearer creation system compares the request to initiate the session to information indicated by the policy, and determines whether a dedicated bearer should be created based on the comparison. The bearer creation system enables a local policy to create a dedicated bearer for the session based on the determination that a dedicated bearer should be created. In some embodiments, the bearer creation system uses a User Plane Function (UPF) to perform the comparison and create the bearer.

In some embodiments, the bearer creation system is be used to support 5QI dedicated bearer based traffic for services such as voice services, video services, data services, etc. In some embodiments, the bearer creation system is used in conjunction with slicing to provide dedicated bearers without using a PCF or BSF.

In some embodiments, the bearer creation system performs a deep packet inspection on the request to initiate a session. The deep packet inspection may be used to obtain information from the request, such as a source IP address, destination IP address, source port, destination port, protocol, or other information included in the request. The information obtained via the deep packet inspection may be compared to policy information associated with a user equipment device that sent the request. The comparison may be performed by using a five-tuple match, which matches the source IP address, destination IP address, source port, destination port, and protocol, from the request to the policy. The comparison may be performed by comparing an identifier for the user equipment device obtained from the information included in the request to initiate the session to information indicated by the policy. The bearer creation system may determine whether to create a dedicated bearer for the session based on the comparison. The bearer creation system may route the session through a default bearer based on the comparison.

In some embodiments, the session is a call, such as a voice call or a video call. The voice call may be a VoNR call. In some embodiments, the request is a SIP request. In some embodiments, the dedicated bearer is a 5QI dedicated bearer.

In some embodiments the bearer creation system determines whether at least one of a PCF or BSF is operational. The bearer creation system may determine that a PCF or BSF is not operational based on a determination that the PCF or BSF is not operating at normal capacity, at full capacity, at all, etc. The bearer creation system may determine that a PCF or BSF is not operational based on a determination that the PCF or BSF is operating at a reduced capacity. The bearer creation system may determine whether a bearer should be created by the UPF based on at least the determination that at least one of the PCF or BSF are not operational and the comparison. The bearer creation system may determine that a PCF or BSF is operating at a reduced capacity based on a determination of whether the PCF or BSF is overloaded, not responding, etc.

In some embodiments, the user equipment is configured to use a network slice. The bearer creation system may be used in conjunction with slicing to provide a dedicated bearer without using a PCF, BSF, or other network infrastructure required to provide a dedicated bearer. The bearer creation system may also be used to create a custom policy, without affecting other shared policies on the slice. Thus, the bearer creation system is able to create dedicated bearers for user equipment while using fewer network resources and functions than other methods of creating dedicated bearers.

In some embodiments, the bearer creation system uses a bearer creation data structure which causes a computer to receive a request to initiate a session from user equipment and determine whether to create a dedicated bearer for the session. The bearer creation data structure may include information indicating a policy associated with the user equipment and information indicating the request to initiate the session. The bearer creation data structure may include information indicating a local policy which can be used to create the dedicated bearer. The bearer creation data structure may include information indicating a default bearer which can be assigned to the session if the dedicated bearer is not created in the event there is a failure in creating the dedicated bearer.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1 is a display diagram showing an example network 100 in which the bearer creation system operates, according to various embodiments described herein. It is to be appreciated that FIG. 1 illustrates just one example of a network in which a bearer creation system operates, and that various embodiments discussed herein are not limited to the use of such an environment. The network 100 includes user equipment 101, a regional data center (RDC) 120, a user plane function (UPF) 121, a national data center (NDC) 130, a BSF 131, a PCF 133, a composer or slice orchestrator 140, and network slice selection function (NSSF) 141.

The network 100 is a network, communication system, or networked system (not shown), to which the user equipment 101, RDC 120, UPF 121, NDC 130, BSF 131, PCF 133, composer 140, NSSF 141 other user equipment devices (not shown), and other network functions (not shown), may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. One or more endpoint devices, such as PCs, tablets, laptop computers, smartphones, personal assistants, Internet connection devices, wireless LAN, WiFi, Worldwide Interoperability for Microwave Access (WiMax) devices, or the like, may be communicatively coupled to the network and/or to each other so that the plurality of endpoint devices are communicatively coupled together. Thus, such a network enables the user equipment 101, RDC 120, UPF 121, NDC 130, BSF 131, PCF 133, composer 140, NSSF 141, other user equipment devices, and other network functions, used as part of the bearer creation system, to communicate with each other.

The user equipment 101 may include devices such as cellular telephones, smartphones, tablets, personal computers, laptop computers, wireless peripheral devices such as headphones, microphones, mice, keyboards, etc., security cameras, Internet of Things (or "smart") devices, televisions, smart televisions, smart television devices—such as FireTV, Roku, AppleTV, etc.,—routers, digital assistants, personal assistant devices—such as Amazon Alexa, Google Home, etc.,—drones, etc. The user equipment 101 may interconnect to one or more communications media or sources, such as routers, network switches, modems, etc., to transmit communications to other devices. The user equipment 101 may connect to the RDC 120 and the NDC 130 to access the internet, participate in calls, etc. The user equipment may connect to the RDC 120 and NDC 130 by using the session initiation protocol (SIP).

The RDC 120 communicates to the NDC 130 through a UPF 121. The RDC 120 is further discussed with regards to FIG. 2.

The UPF 121 performs packet routing and forwarding for user equipment in the network 100. The UPF 121 is also able to perform deep packet inspection on session requests it receives from the RDC 120. The bearer creation system may use the UPF 121 to perform the deep packet inspection, and the five-tuple match. Furthermore, the UPF 121 may include a local policy used by the bearer creation system to create a dedicated bearer.

The NDC 130 communicates with the UPF 121 and BSF 131. The NDC 130 is further discussed with regards to FIG. 3.

The BSF 131 is a function which works with a PCF 133 to help facilitate messaging for the NDC 130 for voice sessions, video sessions, or other sessions within the network 100. The BSF 131 may be used to track sessions in the network. The BSF 131 may also be used to create a dedicated bearer during normal operation of the network 100.

The PCF 133 is a function which manages policies assigned to user equipment devices. The PCF 133 may additionally be used in conjunction with the BSF 131 to create a dedicated bearer during normal operation of the network 100.

The composer or slice orchestrator 140 is used to coordinate network components involved in the life-cycle of each network slice. The composer 140 operates in conjunction with the NSSF 141, which also manages a network slice authorized for use by the user equipment.

During normal operation, the user equipment communicates, such as by transmitting a request to initiate a session, with the RDC 120. The RDC 120 communicates with the UPF 121 to facilitate bearer creation. The RDC 120 communicates with the NDC 130 through the UPF 121. The NDC 130 communicates with the BSF 131 and PCF 133 to create a dedicated bearer, and the PCF 133 communicates with the RDC 120 in order to facilitate the creation of the dedicated bearer. The RDC 120 then communicates with and instructs the UPF 121 to create the dedicated bearer. However, when a connection fails between the PCF 133 and the RDC 120 or BSF 131, the dedicated bearer is not created. Additionally, when the connection fails between the BSF 131 and the NDC 130 or PCF 133, the dedicated bearer is not created.

The embodiments described herein are able to bypass the BSF 131 and PCF 133 when their connection fails, and continue to create a dedicated bearer by using the UPF 121. The UPF 121 communicates with the RDC 120 to create the dedicated bearer after determining that a dedicated bearer should be created for the user equipment 101.

In a case where network slicing is used, the composer 140 instructs the RDC 120 to utilize the UPF 121 for bearer creation, requests that a bearer be created for the user equipment 101. The RDC 120 communicates with the UPF 121 to create the dedicated bearer based after determining that a dedicated bearer should be created.

Example embodiments described herein provide applications, tools, data structures and other support to implement systems and methods for creating dedicated bearers. The example embodiments described herein additionally provide applications, tools, data structures and other support to implement systems and methods for creating a dedicated bearer for a user when a network failure has occurred. Other embodiments of the described techniques may be used for other purposes, including for implementing dedicated bearers within a network slice. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
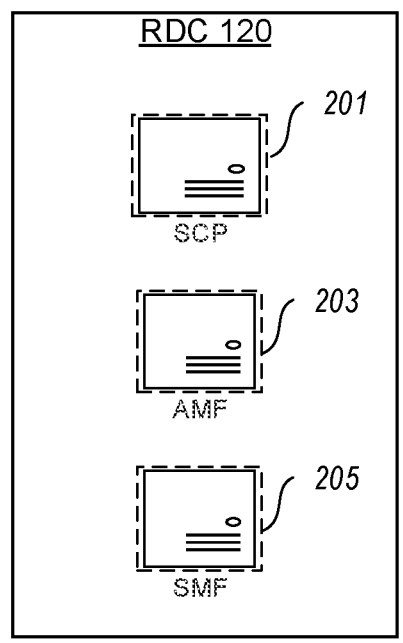
FIG. 2 is a display diagram showing an example RDC, according to various embodiments described herein.

FIG. 2 is a display diagram showing an example RDC 120, according to various embodiments described herein. The RDC 120 includes a service communication proxy (SCP) 201, an access and mobility function (AMF) 203, and a session management function (SMF) 205. The SCP 201 provides message forwarding and routing within the RDC 120. The AMF 203 manages registration, connection, authentication, as well as performing other functions. The SMF 205 manages sessions created for user equipment devices. The SMF 205 additionally communicates with the PCF 133 and UPF 121 to provide session management and instruct the UPF 121 to create a bearer.

Figure 3:
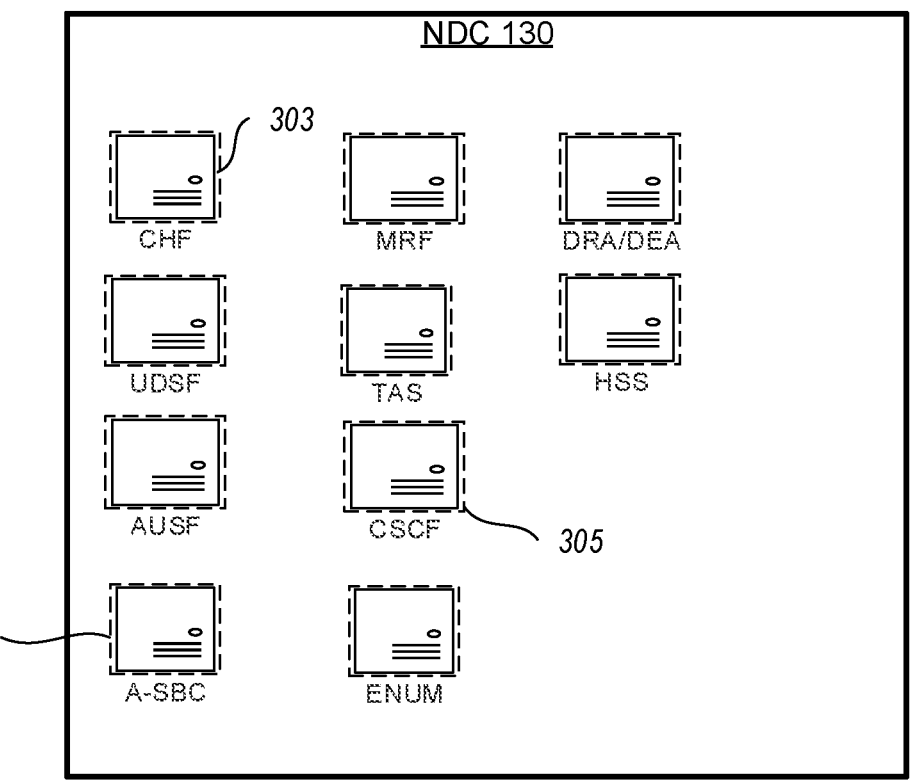
FIG. 3 is a display diagram showing an example NDC, according to various embodiments described herein.

FIG. 3 is a display diagram showing an example NDC 130, according to various embodiments described herein. The NDC 130 includes a session border controller (SBC) 301, a charging function (CHF) 303, and a call session control function (CSCF) 305. The SBC 301 is used to manage sessions and protocols used by functions and devices connected to the network 100 to support the setup of voice sessions, video sessions, and other sessions. The sessions managed by the SBC 301 may be SIP-based, VOIP-based, or based on other protocols used for sessions. The SBC 301 communicates with the CSCF 305 to manage communication between user equipment 101 and other services and networks. The SBC also typically communicates with the BCF 131 to begin the process of setting up a dedicated bearer for a user equipment device 101. The CHF 303 manages and monitors current usage values for quality of service attributes describing the quality of service provided to the user equipment 101. The CSCF 305 manages communication obtained from the user equipment 101 to services and other networks to facilitate services like voice calls, video calls, and other service provided over a network.

Figure 4:
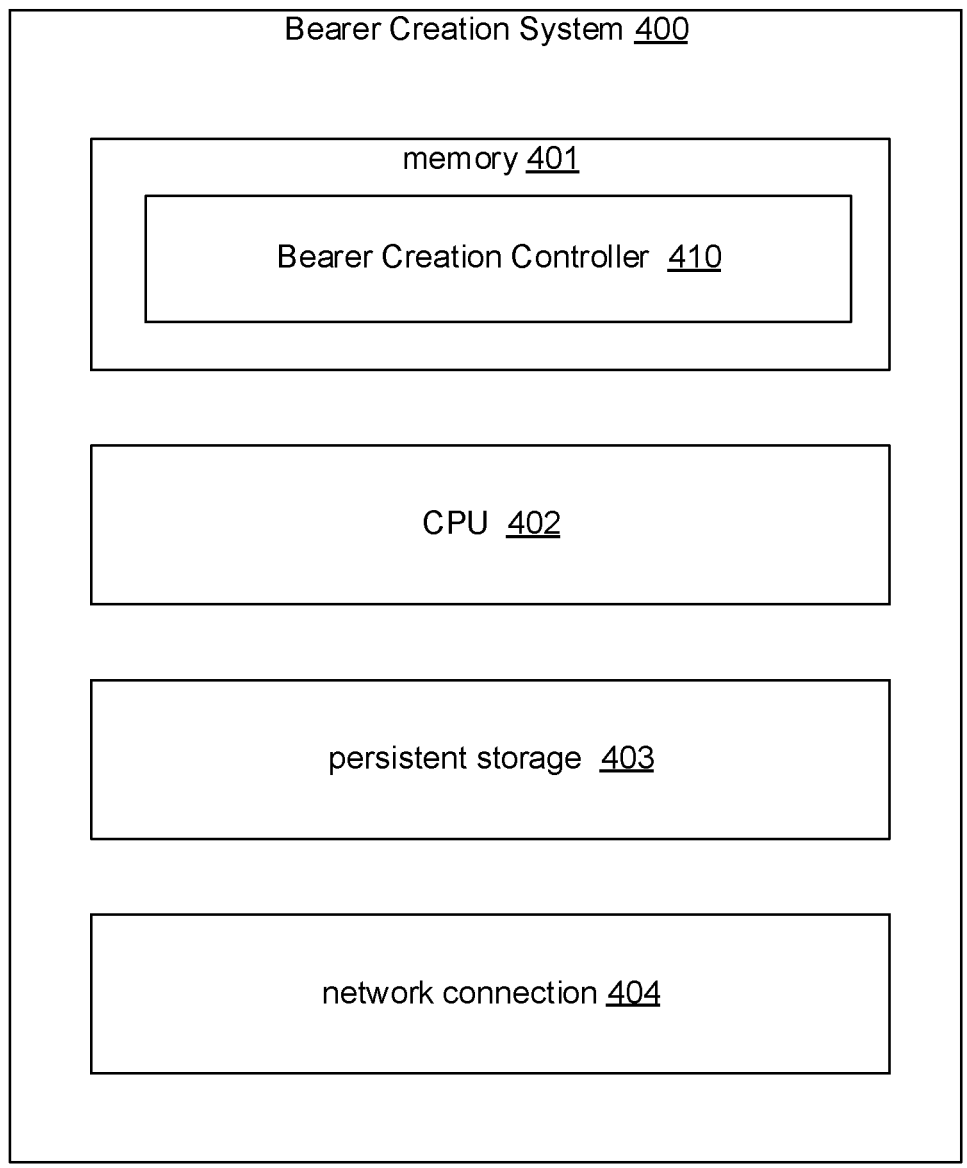
FIG. 4 is a block diagram depicting example components incorporated in a bearer creation system, according to various embodiments described herein.

FIG. 4 is a block diagram depicting example components incorporated in a bearer creation system 400, according to various embodiments described herein. The bearer creation system 400 may be: located on the network 100 in a position to communicate with the UPF 121, SMF 205, and SBC 301; integrated as part of the SMF 205, UPF 121, or another network function; a standalone network function; or any other network function, device, computer system, etc., able to communicate with the network functions described herein. In various embodiments, the bearer creation system 400 includes one or more of the following: a computer memory 401 for storing programs and data while they are being used, including data associated with the user equipment 101, policies applied to the user equipment 101, and the bearer creation system 400, an operating system including a kernel, and device drivers; a central processing unit (CPU) 402 for executing computer programs; a persistent storage device 403, such as a hard drive or flash drive for persistently storing programs and data; and a network connection 404 for connecting to one or more functions, such as UPF 121, SMF 205, SBC 301, and/or other network functions, and for connecting to one or more computer devices such as the user equipment 101 and/or other computer systems, to send and/or receive data, such as via the Internet or another network and associated networking hardware, such as switches, routers, repeaters, electrical cables and optical fibers, light emitters and receivers, radio transmitters and receivers, and the like, and to scan for and retrieve signals from functions, such as UPF 121, SMF 205, SBC 301, and/or other network functions, and for connecting to one or more computer devices such as the user equipment 101 and/or other computer systems. In various embodiments, the bearer creation system 400 additionally includes input and output devices, such as a keyboard, a mouse, display devices, etc.

While a bearer creation system 400 configured as described may be used in some embodiments, in various other embodiments, the bearer creation system 400 may be implemented using devices of various types and configurations, and having various components. The memory 401 may include a bearer creation controller 410 which contains computer-executable instructions that, when executed by the CPU 402, cause the bearer creation system 400 to perform the operations and functions described herein. For example, the programs referenced above, which may be stored in computer memory 401, may include or be comprised of such computer-executable instructions. The memory 401 may also include an index of quality of service attribute thresholds.

The bearer creation controller 410 performs the core functions of the bearer creation system 400, as discussed herein and also with respect to FIGS. 5 through 9. In particular, the bearer creation controller 410 determines whether a dedicated bearer should be created for a user equipment device. Additionally, the bearer creation controller 410 may compare a request received from a user equipment device to a policy to determine whether the dedicated bearer should be created. The bearer creation controller 410 may also determine whether a BSF 131 or PCF 133 are not operational, and may determine whether to create the dedicated bearer based on a determination that at least one of the BSF 131 or PCF 133 are not operational. In some embodiments, the bearer creation controller 410 creates a dedicated bearer for a network slice. In some embodiments, the bearer creation controller 410 uses a default bearer when a dedicated bearer is not created. In some embodiments, the bearer creation controller 410 performs a deep packet inspection on the request. In some embodiments, the bearer creation controller 410 performs a five-tuple match as part of the comparison of the request to the policy.

In an example embodiment, the bearer creation controller 410 and/or computer-executable instructions stored on memory 401 of the bearer creation system 400 are implemented using standard programming techniques. For example, the bearer creation controller 410 and/or computer-executable instructions stored on memory 401 of the bearer creation system 400 may be implemented as a "native" executable running on CPU 402, along with one or more static or dynamic libraries. In other embodiments, the bearer creation controller 410 and/or computer-executable instructions stored on memory 401 of the bearer creation system 400 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the bearer creation system 400.

In addition, programming interfaces to the data stored as part of the bearer creation controller 410 can be available by standard mechanisms such as through C, C++, C #, Java, and web APIs; libraries for accessing files, databases, or other data repositories; through scripting languages such as JavaScript and VBScript; or through Web servers, FTP servers, or other types of servers providing access to stored data. The bearer creation controller 410 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the bearer creation system 400, user equipment 101, SMF 205, and/or UPF 121.

Furthermore, in some embodiments, some or all of the components/portions of the bearer creation controller 410, and/or functionality provided by the computer-executable instructions stored on memory 401 of the bearer creation system 400 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

Figure 5:
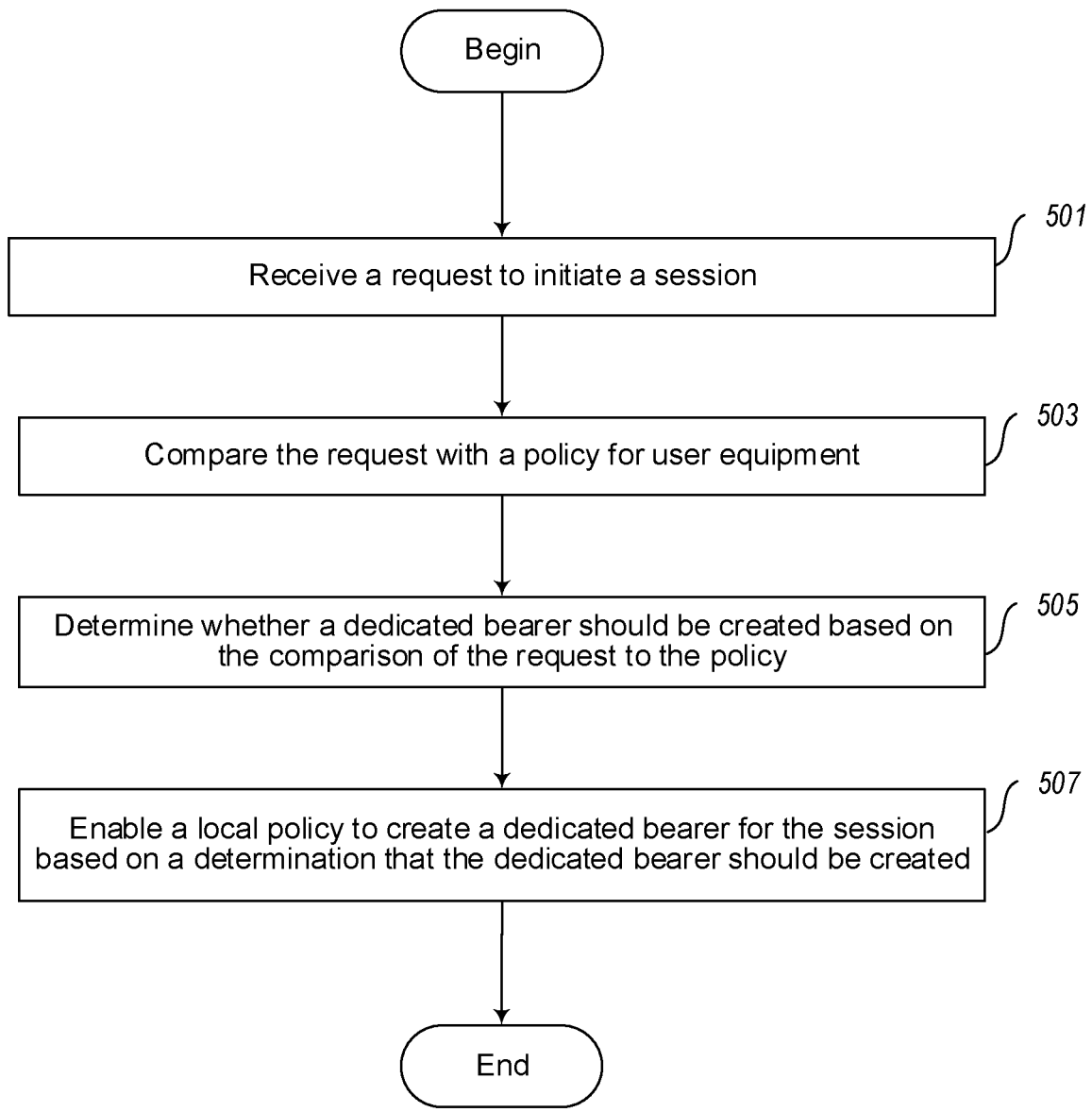
FIG. 5 is a flow diagram depicting a process for creating a dedicated bearer, according to various embodiments described herein.

FIG. 5 is a flow diagram depicting a process for creating a dedicated bearer, according to various embodiments described herein. At act 501, the bearer creation system receives a request to initiate a session from user equipment. The session may be a call, such as a VoNR call, video call, voice call, etc. The bearer creation system may receive the request to initiate the session at a UPF 121. The request to initiate a session may be transmitted from user equipment. The request to initiate a session may be transmitted using the SIP protocol.

At act 503, the bearer creation system compares the request to initiate the session with a policy associated with the user equipment. The policy may be a policy accessible by a UPF 121. The bearer creation system may perform the comparison by using the UPF 121 to obtain information from the request by performing a deep packet inspection. The information may include a source IP address, source port, destination IP address, destination port, and protocol from the request. The comparison may be performed by comparing information obtained from the request to initiate the session to information indicated by the policy associated with the user equipment. The information indicated by the policy may also include a source IP address, source port, destination IP address, destination port, and protocol. The comparison may include performing a five-tuple match on the information obtained from the request and the information indicated by the policy.

At act 505, the bearer creation system determines whether a dedicated bearer should be created for the user equipment based on the comparison of the request to the policy. The bearer creation system may determine that a dedicated bearer should be created when the information obtained from the request and the information indicated by the policy match.

At act 507, the bearer creation system uses a local policy to create a dedicated bearer for the session based on a determination that the dedicated bearer should be created. The bearer creation system may use the UPF to create the dedicated bearer and notify the SMF 205 that a bearer is to be created based on a local policy match. In some embodiments, the local policy includes information used to create the dedicated bearer, such as quality of service attributes for the dedicated bearer. The local policy may be accessible by the UPF 121. After act 507, the process ends.

Figure 6:
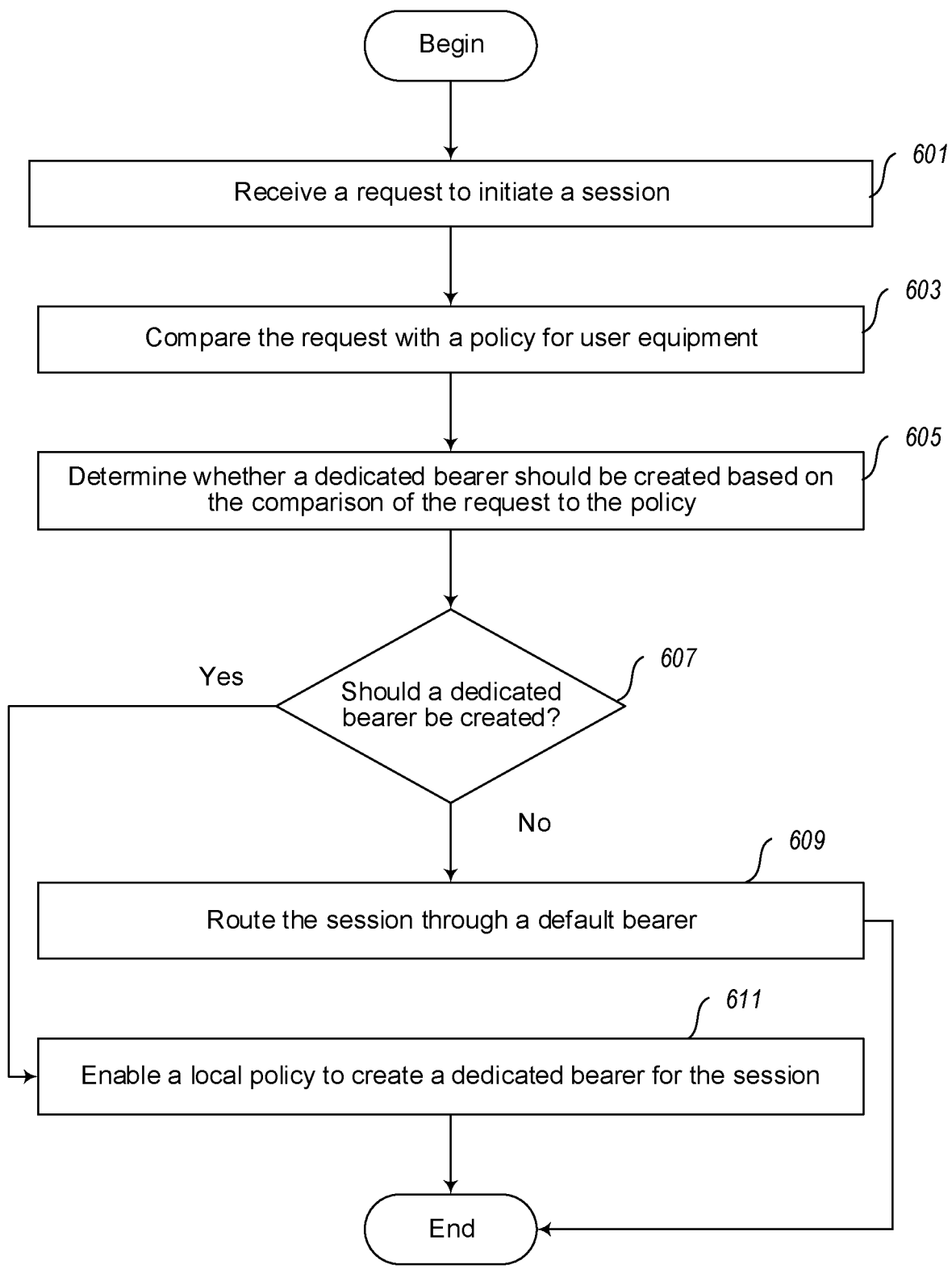
FIG. 6 is a flow diagram depicting a process to determine whether a session should use a dedicated bearer, according to various embodiments described herein.

FIG. 6 is a flow diagram depicting a process to determine whether a session should use a dedicated bearer, according to various embodiments described herein. Acts 601-605 proceed similarly to acts 501-505. At act 607, if the dedicated bearer should be created the process proceeds to act 611, otherwise the process proceeds to act 609. At act 609, the bearer creation system does not create a dedicated bearer, and the session is routed through a default bearer. At act 611, the bearer creation system enables a local policy to create a dedicated bearer for the session in a similar manner to act 507.

Figure 7:
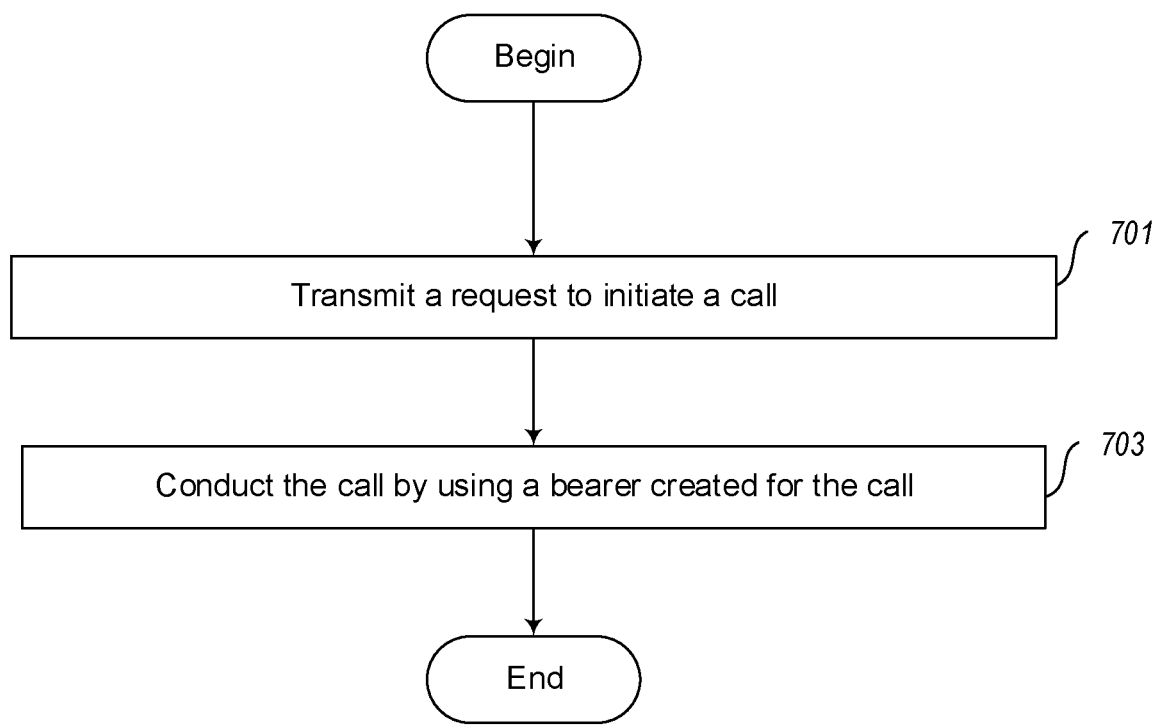
FIG. 7 is a flow diagram depicting a process for user equipment to use a dedicated bearer, according to various embodiments discussed herein.

FIG. 7 is a flow diagram depicting a process for user equipment to use a dedicated bearer, according to various embodiments discussed herein. At act 701, the user equipment device transmits a request to initiate a call to the bearer creation system. The bearer creation system may receive the request to initiate the call at an RDC 120 may use an SMF 205 and UPF 121 to create a session for the call. The request may include information such as a source IP address, a source port, a destination port, a destination IP address, a protocol, an identifier for the user equipment, etc. The request may be transmitted via SIP protocol. The call may be a voice call, VoNR call, video call, etc.

The bearer creation system may compare the request to a policy accessible by the UPF 121. The comparison may include performing a five-tuple match, where the five values in the five-tuple match include a source network address, source port, destination network address, destination port, and the protocol being used. To perform the five-tuple match, the bearer creation system may match compares five values specified by the policy to five values obtained from the request. The bearer creation system may perform a deep packet inspection on the request to obtain the five values. The bearer creation system may create a dedicated bearer to conduct the call based on a comparison of the request to the policy. The system may route the call through a default bearer based on the comparison of the request to the policy.

At act 703, the user equipment uses a bearer to conduct the call. The bearer may be a dedicated bearer created by the bearer creation system based on a comparison of the request to the policy. The bearer may be a default bearer which the bearer creation system assigns to the user equipment based on the comparison of the request to the policy. After act 703, the process ends.

Figure 8:
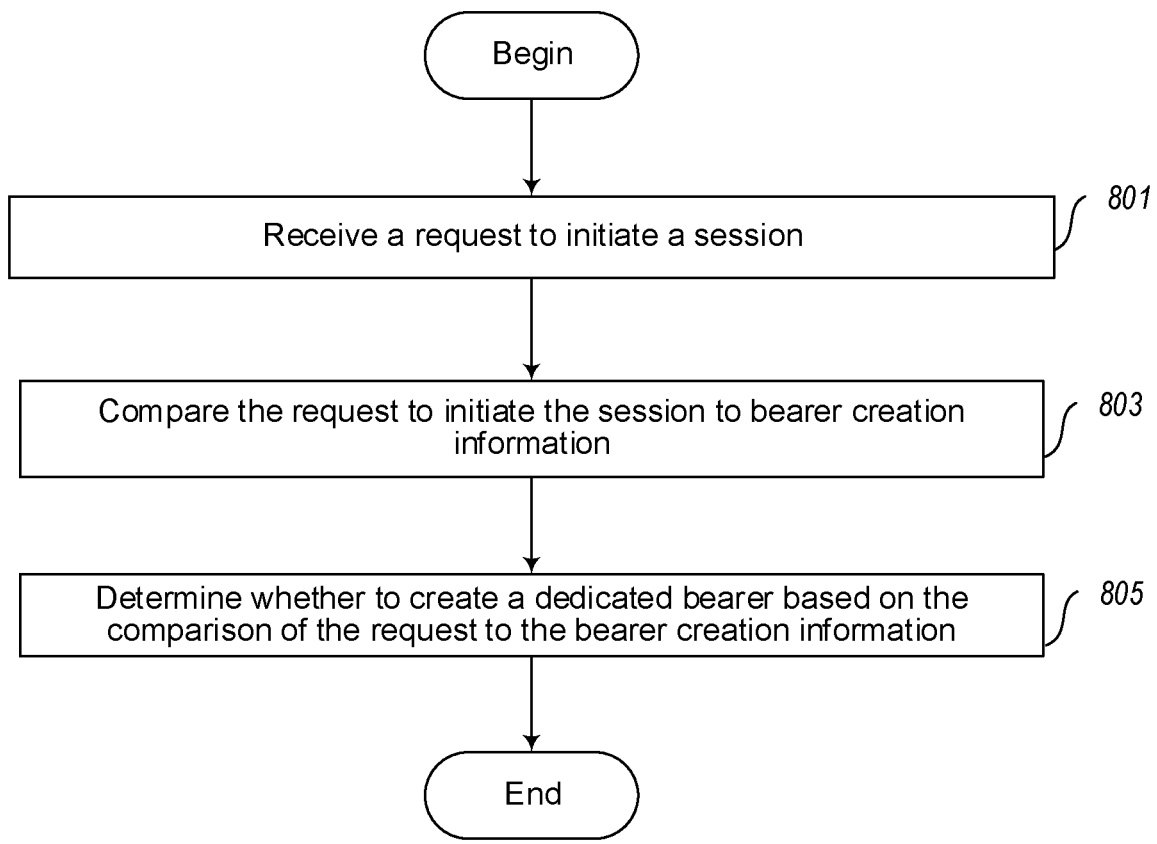
FIG. 8 is a flow diagram depicting a process to use a bearer creation data structure to determine whether to create a dedicated bearer for a session.

FIG. 8 is a flow diagram depicting a process to use a bearer creation data structure to determine whether to create a dedicated bearer for a session. The bearer creation system performs act 801 in a similar manner to acts 501 and 601.

At act 803, the bearer creation system compares the request to initiate the session to bearer creation information stored in the bearer creation data structure. The bearer creation information is associated with a policy. The bearer creation data structure may include information indicating the policy. The bearer creation information includes information used to determine whether a dedicated bearer should be created. The bearer creation information may include information such as a source IP address, a source port, a destination port, a destination IP address, a protocol, an identifier for the user equipment, etc., which is compared to the request to initiate the session. The bearer creation system may perform the comparison by using the UPF 121 to obtain information from the request by performing a deep packet inspection. The information may include a source IP address, source port, destination IP address, destination port, and protocol from the request. The comparison may be performed by comparing information obtained from the request to initiate the session to information included in the bearer creation data structure. The comparison may include performing a five-tuple match on the information obtained from the request and the information indicated by the policy.

At act 805, the bearer creation system uses the bearer creation data structure to determine whether to create a dedicated bearer based on the comparison of the request to the bearer creation information. The bearer creation system may determine that a dedicated bearer should be created when the information obtained from the request and the information indicated by the policy match. In some embodiments, the bearer creation data structure includes a local policy. The local policy may be used to create the dedicated bearer, such as by defining a level of quality of service guaranteed by the dedicated bearer.

After act 805, the process ends.

Figure 9:
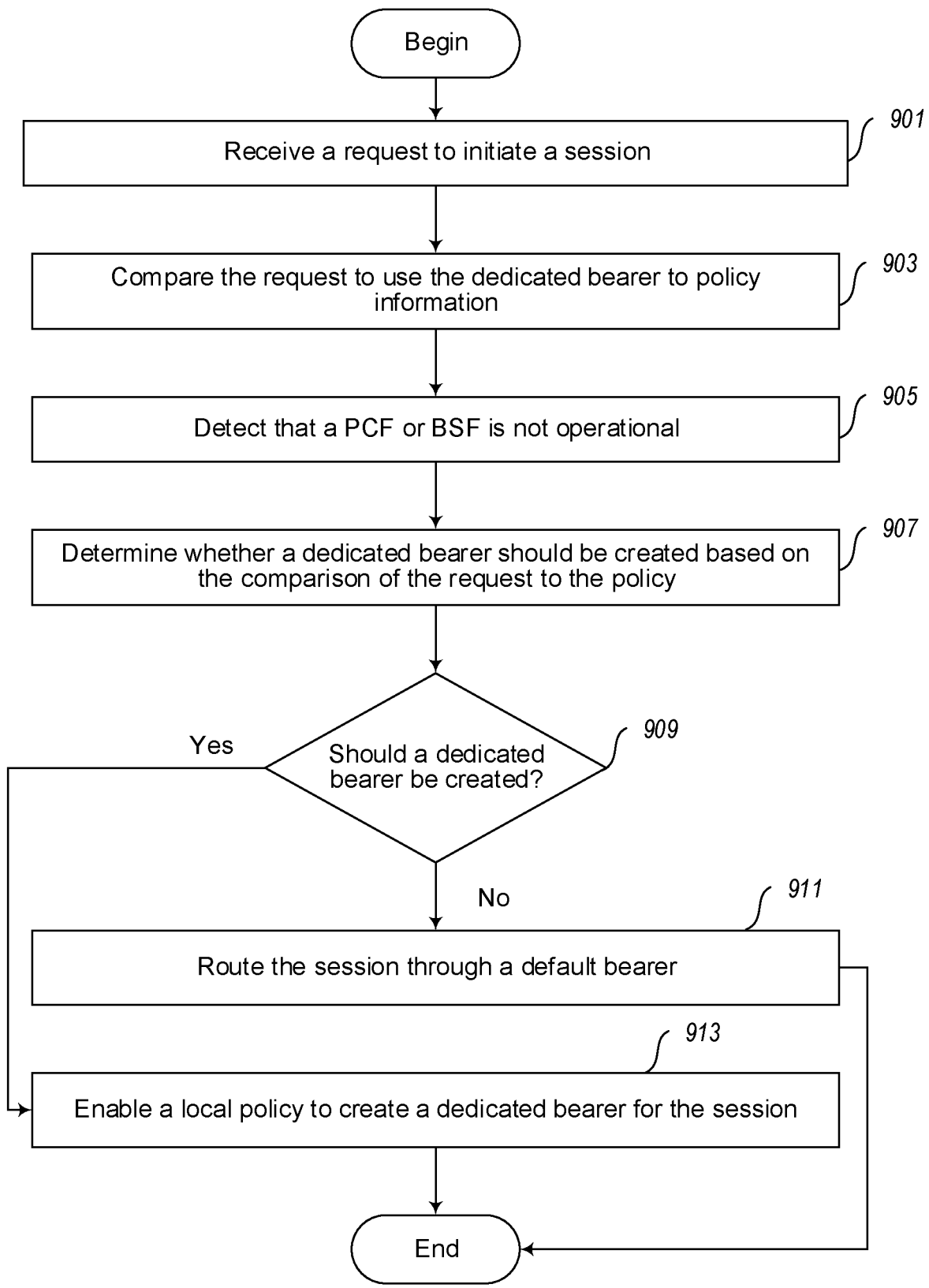
FIG. 9 is a flow diagram depicting a process to create a dedicated bearer in the event of a network failure.

FIG. 9 is a flow diagram depicting a process to create a dedicated bearer in the event of a network failure. Acts 901-903 proceed similarly to acts 501-503.

At act 905, the bearer creation system detects that a network failure has occurred, such as at least one of the PCF 133 or BSF 131 not being operational. The bearer creation system may detect that the PCF 133 is not operational by receiving an error from the PCF, for example, the bearer creation system may receive an "N7 connection down" error. The bearer creation system may detect that the BSF 131 is not operational by receiving an error from the BSF, for example, the bearer creation system may receive an "Rx connection down" error. The error may be detected at the SBC, the SMF, or at another function used by the bearer creation system, RDC 120, or NDC 130. In some embodiments, the bearer creation system determines that at least one of the PCF 133 or BSF 131 are not operational based on a determination of the network load, network capacity, etc.

At act 907, the bearer creation system determines whether a dedicated bearer should be created based on the comparison of the request to the policy information. The bearer creation system may also determine whether to create a dedicated bearer based on a determination, or detection, that a network failure has occurred, such as at least one of the PCF 133 or BSF 131 not being operational.

At act 909, if the dedicated bearer should be created the process continues to 913, otherwise the process continues to act 911. Acts 911 and 913 proceed in a similar manner to acts 609 and 611. After act 913, the process ends.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    at least one processor; and
    at least one memory coupled to the at least one processor, the memory having computer-executable instructions stored thereon that, when executed by the at least one processor, cause the system to:
        electronically detect that a request to initiate a session has been sent by user equipment, the user equipment being associated with a network policy;
        electronically compare the request to initiate the session to information indicated by the network policy;
        electronically initiate the session based on the comparison of the request to the information indicated by the network policy;
        electronically detect a failure event associated with at least one network infrastructure component used to initiate the session;
        electronically determine whether a dedicated bearer should be created based on the comparison of the request to the information indicated by the network policy; and
        electronically enable a local network policy to create a dedicated bearer for the session based on a determination that a dedicated bearer should be created.

2. The system of claim 1, wherein comparing the request to initiate the session to information indicated by the network policy further comprises performing deep packet inspection on the request.

3. The system of claim 2, wherein comparing the request to initiate the session to information indicated by the network policy further comprises performing a five-tuple match.

4. The system of claim 1, wherein the computer-executable instructions further cause the system to:
    electronically route the session through a default bearer based on a determination that the dedicated bearer should not be created.

5. The system of claim 1, wherein the session comprises a voice call.

6. The system of claim 1, wherein the session comprises a video call.

7. The system of claim 1, wherein the request comprises a SIP request.

8. The system of claim 1, wherein, the local network policy indicates one or more quality of service attributes associated with the user equipment.

9. The system of claim 1, wherein dedicated bearer is a 5QI dedicated bearer.

10. The system of claim 1, wherein the user equipment is configured to use a network slice.

11. A method in user equipment, the method comprising:
    electronically transmitting a request to initiate a call;
    electronically conducting a session by using a bearer, wherein the bearer is created based on at least:
        a comparison of the request to initiate the call with information indicated by a network policy associated with the user equipment;
        a determination of whether to create a dedicated bearer based on at least the comparison of the request to the information indicated by the network policy and a detected failure event for at least one network infrastructure component; and
        a local network policy indicating one or more quality of service attributes associated with the user device, wherein the bearer is created as a dedicated bearer based on a determination that a dedicated bearer should be created.

12. The method of claim 11, wherein the bearer is created as a default bearer based on a determination that a dedicated bearer should not be created.

13. The method of claim 11, wherein the call comprises a voice call.

14. The method of claim 11, wherein the call comprises a video call.

15. The method of claim 11, wherein the request comprises a SIP request.

16. One or more storage devices collectively storing a bearer creation data structure for access and processing by a program executed by at least one computer processor that, when accessed and processed by at least one computer processor, functionally enables the computer processor to:
    receive a request to initiate a session, the request being transmitted by user equipment;

initiate the session based on a comparison of the request to information indicated by a network policy; and determine whether to create a dedicated bearer for the session, the bearer creation data structure comprising:
information indicating a network policy associated with the user equipment, the network policy including bearer creation information for the network policy;
information indicating a local network policy used to create a dedicated bearer; and
information indicating the request to initiate the session,
wherein the bearer creation information is compared to the request to initiate the session,
wherein the detection of the failure event, the comparison of the bearer creation information, and the request to initiate the session are used to determine whether to create a dedicated bearer for a call, and
wherein a network infrastructure component accesses the information indicating the local network policy to create the dedicated bearer based on the determination that the dedicated bearer should be created.

17. The one or more storage devices of claim 16, wherein the information indicating the local network policy further comprises:
information indicating one or more quality of service attributes.

18. The one or more storage devices of claim 16, wherein the bearer creation data structure further comprises:
information indicating a default bearer, wherein the default bearer is used for the session in response to a determination that the dedicated bearer should not be created for the call.

19. The one or more storage devices of claim 16, wherein the comparison of the bearer creation information and the request to initiate the session further comprises a deep packet inspection.

20. The one or more storage devices of claim 16, wherein the request to initiate the session comprises a SIP request.

* * * * *